US009651753B2

United States Patent
Hurley et al.

(10) Patent No.: US 9,651,753 B2
(45) Date of Patent: May 16, 2017

(54) FIBER OPTIC RIBBON CABLE

(71) Applicant: Corning Optical Communications LLC, Hickory, NC (US)

(72) Inventors: William Carl Hurley, Hickory, NC (US); Kenneth Todd James, Lenoir, NC (US); James Phillip Luther, Hickory, NC (US); Radawan Ripumaree, Granite Falls, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/180,113

(22) Filed: Jun. 13, 2016

(65) Prior Publication Data

US 2016/0291276 A1 Oct. 6, 2016

Related U.S. Application Data

(62) Division of application No. 13/743,852, filed on Jan. 17, 2013, now Pat. No. 9,389,381.

(51) Int. Cl.
*G02B 6/44* (2006.01)

(52) U.S. Cl.
CPC ......... *G02B 6/4403* (2013.01); *G02B 6/4433* (2013.01); *G02B 6/4482* (2013.01)

(58) Field of Classification Search
None
See application file for complete search history.

(56) References Cited

U.S. PATENT DOCUMENTS 5,249,249 A * 9/1993 Eoll ..................... G02B 6/4403
385/110
6,321,013 B1 11/2001 Hardwick, III et al.
(Continued)

FOREIGN PATENT DOCUMENTS

EP 1286195 A2 2/2003
EP 1326113 B1 4/2007
(Continued)

OTHER PUBLICATIONS

Corning Cable Systems, Ribbon Interconnect Cable, Plenum, 4F, Part No. 004TJ8-41191-0F, 2013, 4 pages.
(Continued)

*Primary Examiner* — Hemang Sanghavi
(74) *Attorney, Agent, or Firm* — William D. Doyle

(57) ABSTRACT

A fiber optic ribbon cable includes a stack of fiber optic ribbons, strength members surrounding the stack, and a jacket defining an exterior of the cable. The jacket forms a cavity through which the stack and the strength members extend. The stack has a bend preference, but the strength members are positioned around the stack or are flexible in bending such that the strength members do not have a bend preference. Furthermore, the jacket is structured such that the jacket does not have a bend preference. The cavity is sized relative to the stack in order to allow the stack to bend and twist within the cavity with respect to the jacket as the cable bends, facilitating movement of the optical fibers of the fiber optic ribbons to low-stress positions within the cavity and decoupling the bend preference of the stack from transfer to the jacket.

6 Claims, 1 Drawing Sheet

(56) References Cited

U.S. PATENT DOCUMENTS

| | | | |
|---|---|---|---|
| 6,404,962 B1 | 6/2002 | Hardwick, III et al. | |
| 6,487,348 B1 * | 11/2002 | Jackson | G02B 6/4411 |
| | | | 385/104 |
| 6,876,807 B2 | 4/2005 | Lanier et al. | |
| 6,957,000 B2 | 10/2005 | McAlpine et al. | |
| 7,197,215 B2 | 3/2007 | Baird et al. | |
| 2002/0154873 A1 | 10/2002 | Sheu | |
| 2002/0197032 A1 * | 12/2002 | Conrad | G02B 6/4482 |
| | | | 385/114 |
| 2003/0016924 A1 * | 1/2003 | Thompson | G02B 6/4482 |
| | | | 385/114 |
| 2010/0135625 A1 | 6/2010 | Overton | |
| 2011/0262148 A1 | 10/2011 | Weimann | |
| 2013/0129288 A1 | 5/2013 | Homma et al. | |

FOREIGN PATENT DOCUMENTS

| | | | |
|---|---|---|---|
| JP | 1138292 A | 5/1989 | |
| JP | 200206380 | 7/2000 | |
| JP | 2000206383 A | 7/2000 | |
| JP | 2001194567 A | 7/2001 | |
| JP | 2011232621 A | * 11/2011 | |

OTHER PUBLICATIONS

International Search Report and Written Opinion of the International Searching Authority; PCT/US2014/011234; Mailed Sep. 19, 2014; 14 pages.

* cited by examiner

FIBER OPTIC RIBBON CABLE

RELATED APPLICATIONS

This application is a divisional of U.S. application Ser. No. 13/743,852 filed on Jan. 17, 2013, the content of which is relied upon and incorporated herein by reference in its entirety.

BACKGROUND

Aspects of the present disclosure relate generally to fiber optic cables. More specifically, some aspects of the present disclosure relate to fiber optic cables supporting ribbons of optical fibers, such as for device-interconnection applications in data centers and the like.

Demand for increasing bandwidth of data communication systems has been addressed by various means, such as using wavelength division multiplexing (WDM). However, costs of transmitters and optical devices for WDM to combine signals at the transmitter and separate them back out at the receiver may be prohibitive for some cost-sensitive applications. Another approach to increasing bandwidth has been increasing transmitter speed from 1 gigabits per second (Gbps) to 10 Gbps, and recently to 25 Gbps, with low-cost vertical-cavity surface-emitting lasers (VCSELs). However, VCSEL technology may have reached a maximum speed limit of 25 Gbps per optical channel and there is demand for 40 Gbps and 100 Gbps systems.

Yet another low-cost solution for increasing bandwidth is use of VCSELs coupled with parallel-optic transmissions, where a signal may be broken down into sub-signals, parsed, communicated via into separate optical fibers for transmission in parallel with one another, and then reconfigured upon receipt. Standard schemes for parallel-optic transmissions are described in IEEE 802.3-2005: Information Technology-Telecommunications information And Exchange Between Systems—LAN/MAN—Specific Requirements—Part 3.

Two types of fiber optic cables used with parallel-optic transmission systems include loose fiber cables and fiber optic ribbon cables. Ribbon cables offer advantages over loose fiber cables, such as ordered arrangements of the optical fibers, facilitating efficient and accurate attachment of a connector to the ribbons. However, traditional ribbon cables may exhibit strong preferential bending and/or are inflexible, such as due to the presence of a buffer tube protecting the ribbon stack, arrangements of rigid strength members, and/or a generally long lay-length of the ribbon stack (i.e. distance for one full twist of the stack, which is typically wound within such a cable to reduce stresses on the stack when the cable bends). As such, loose fiber cables are currently more-preferred in the industry because they are generally smaller and more flexible. A need exists for a ribbon cable that is flexible and has little or no bend preference, similar to a loose fiber cable, such as for use interconnecting optical devices used with parallel-optic transmission systems.

SUMMARY

One embodiment relates to a fiber optic ribbon cable, which includes a stack of fiber optic ribbons, strength members surrounding the stack, and a jacket defining an exterior of the cable. The jacket forms a cavity through which extend the stack and the strength members. The stack has a bend preference, but the strength members are positioned around the stack or are flexible in bending such that the strength members, when integrated in the cable, do not have a bend preference. Furthermore, the jacket, being round or substantially round and having a generally uniform thickness, is structured such that the jacket does not have a bend preference. The cavity is sized relative to the stack with free space therebetween in order to allow the stack to bend and twist within the cavity with respect to the jacket as the cable bends, facilitating movement of the optical fibers of the fiber optic ribbons to low-stress positions within the cavity and decoupling the bend preference of the stack from transfer to the jacket.

Another embodiment relates to a fiber optic ribbon cable, which includes a stack of fiber optic ribbons and a jacket that forms a cavity through which extends the stack of fiber optic ribbons. The fiber optic ribbons of the stack are bound to one another and constrained within a thin membrane of polymeric material enclosing the stack of fiber optic ribbons around the exterior thereof. As such, the thin membrane of polymeric material limits movement of the fiber optic ribbons of the stack relative to one another. The polymeric material may be isotropic and continuous. In some such embodiments, the jacket includes a flame-retardant material and has an outer diameter of 5 mm or less. The flame-retardant material may be particularly soft or flexible, so the jacket thickness is at least 0.45 mm, which prevents kinking. But the thickness of the jacket is 1.2 mm or less, which maintains flexibility of the cable, and allows for insertion of the cable in small passages and micro-ducts.

Yet another embodiment relates to a fiber optic ribbon cable, which includes a stack of fiber optic ribbons. The stack includes at least three fiber optic ribbons, where each fiber optic ribbon includes at least eight optical fibers arranged side-by-side and coupled to one another in a common matrix. The matrix may be an ultra-violet light curable resin. Each of the fiber optic ribbons of the stack includes uncolored optical fibers, where paints or dyes have not been added to distinguish the fibers from one another. Also, at least one of the optical fibers of at least one of the ribbons of the stack is colored. Orientation and polarity of one or more of the fiber optic ribbons of the stack is identifiable by the arrangement of the colored optical fiber with respect to the uncolored optical fibers. For example, the colored optical fiber may be located in the upper-left or another particular corner of the stack to distinguish the corner from other corners of the stack and hence to provide the orientation of the stack. In other embodiments, the stack may include two ribbons, four ribbons or other numbers of ribbons.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
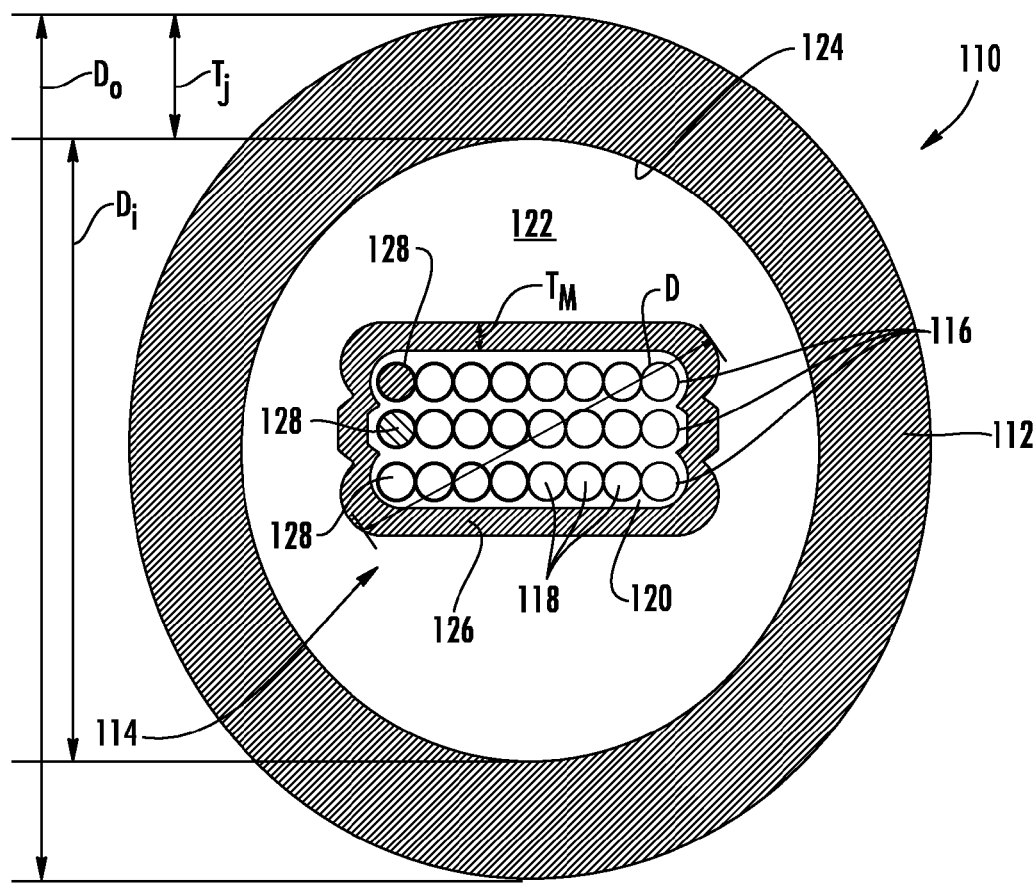
FIG. 1 is a cross-sectional view of a fiber optic ribbon cable according to an exemplary embodiment.

Referring to FIG. 1, a fiber optic ribbon cable 110 includes a jacket 112 surrounding a stack 114 of fiber optic ribbons 116. According to an exemplary embodiment, the stack 114 of fiber optic ribbons 116 includes at least three fiber optic ribbons 116, where each fiber optic ribbon 116 includes at least eight optical fibers 118 arranged side-by-side and coupled to one another in a common matrix 120, such as an ultra-violet light curable resin (e.g. acrylate).

Strength members 122, such as aramid and/or fiberglass yarns, may be disposed between the stack 114 of fiber optic ribbons 116 and the interior 124 of the jacket 112. In some embodiments, the stack 114 includes a thin membrane 126 (e.g., binder, film, encapsulate, tight-buffer) that constrains the individual fiber optic ribbons 116 of the stack 114. The thin membrane 126 may be easily stripped from the stack 114 to access individual fiber optic ribbons 116. As shown in FIG. 1, the fiber optic ribbon cable 110 is a small, flexible ribbon cable configured for use with parallel-optic transmission systems, such as the assembly 210 of FIG. 2.

According to an exemplary embodiment, the strength members 122 are not rigid in bending and/or are positioned uniformly around the stack 114 of ribbons 116. By "not rigid in bending," Applicants mean that a 20 cm length of an individual element of the strength member (e.g., one yarn, rod) held horizontally on one end will bend under gravity such that the other end is at least 60-degrees below the horizon. Accordingly, in any such arrangement, the strength members 122 do not contribute substantially to a bend preference of the cable 110. With regard to the term "bend preference," Applicants mean that a cantilevered end (with full moment connection) of the respective element (e.g., a cable length of 20 cm) more readily bends in one direction than another such that there is a ratio of maximum to minimum bending moment for the cantilevered element that is greater than one, such as at least 1.5.

According to an exemplary embodiment, the strength members 122 are tensile yarns, such as aramid and/or fiberglass yarns. In some embodiments, the strength members 122 include at least two tensile yarns of at least 800 denier or greater. The strength members may be stranded. For interconnect applications, the strength members 122 include at least four tensile yarns of at least 800 denier or greater, and the four yarns may be of 1420 denier or greater. The yarns provide tensile strength to the cable and may reduce friction or other contact between the jacket and the ribbon stack. However, Applicants have found that overcrowding of the stack 114 with strength members 122 hamper free movement of the ribbon stack 114 within the jacket 112. Accordingly, in some embodiments, the cable 110 has eight or less tensile yarns with 2000 denier or less.

In some such embodiments, the tensile yarns are disposed in contact with the stack 114 of ribbons 116. With the tensile yarns exterior to and surrounding the stack 114, the jacket 112 may be extruded around the tensile yarns without contacting the stack 114. The cable 110 may be made as an indoor/outdoor cable by adding a water-swell yarn or water-swell powders, by increasing the amount of tensile yarn, and/or by selecting the appropriate jacket material (e.g., medium density polyethylene with carbon black additive). In other contemplated embodiments, strength members 122 of the cable may be rigid (e.g., glass-reinforced plastic, steel rods), embedded in the jacket 112, and/or contribute to a bend preference of the cable 110.

According to an exemplary embodiment, the jacket 112 is formed from a fire-retardant polymer, such as flame-retardant polyethylene, flame-retardant polyvinyl chloride, or another material, that enables the cable 110 to achieve a plenum-, riser-, or low-smoke-zero-halogen (LSZH-) burn listing. However, Applicants have found that use of such material causes the jacket 112 to kink in bending, resulting in greater potential for attenuation, unless the jacket 112 is at least 0.3 thick, such as 0.45 or greater, for a jacket 112 of 5 mm or less in outer diameter $D_o$ (e.g., 4 mm or less). Applicants have found 1.2 mm or less, such as 1 mm or less, to be an upper bound for wall thickness $T_j$ that may provide sufficient flexibility of the cable 110, particularly if no buffer tube or rigid strength members are included. For example, the cable 110 with three eight-fiber ribbons 116, as shown in FIG. 1, has a wall thickness $T_j$ between 0.45 to 0.6 mm, which Applicants find to prevent kinking, provide sufficient fire resistance, and be flexible.

Furthermore, the jacket 112 of the cable 110 may be round or substantially round (e.g., octagonal) and uniform in thickness $T_j$ such that the jacket 112 does not contribute substantially to a bend preference of the cable 110. In still other embodiments, the cable may be a "flat" drop cable having an oblong cross-sectional periphery, or may be otherwise shaped, such that a bend performance exists, but other features disclosed herein may be present, such as the ribbon fiber colors, thin membrane 126, and other features.

In some embodiments, a natural or inherent bend preference of the fiber optic ribbons 116 of the stack 114 is a source of bend preference within the cable 110. In some embodiments, the only substantial source of bend preference within the cable 110 is from the natural bend preference of the fiber optic ribbons 116 of the stack 114, such that other sources of bending preference, such as asymmetry provided by ripcords, markings, and the like, result in bend preference that is less than the bend preference of the ribbon stack 114 by an order of magnitude or more.

According to an exemplary embodiment, the stack 114 of ribbons 116 is loosely positioned within a jacket 112 such that the stack 114 has room to flex and bend as the cable 110 bends, allowing the optical fibers 118 of the stack 114 to move to low-stress positions as the cable 110 is handled. Use of free space works in conjunction with the other structural features of the cable to reduce the net preferential bend by at least partially decoupling the ribbon stack 114 from the interior of the jacket 124. Put another way, elimination of preferential bending may be achieved, in substance, by allowing sufficient free space within the cable 110 for the ribbon stack 114 to the flex, twist, and adjust position when the cable 110 bends.

According to an exemplary embodiment, such as one with a round cross-section of the cable 110, the inside diameter $D_i$ of the cable 110 is at least 0.2 mm larger than the ribbon stack diagonal D, such as at least 0.4 mm; but, preferably less than 1.0 mm larger, such as less than 0.6 mm. Based on Applicants' understanding of the present technology, the following equation provides a theoretical upper bound to the radius R of the cavity (i.e., half of $D_i$, as shown in FIG. 1) for a ribbon stack 114 of n ribbons 116, each of thickness t and of width w, so that the ribbons 116 of the stack 114 are too wide to pass around one another in the stack 114 and to move out of order, assuming that the cavity has a circular shape, the ribbons are inflexible, there is no space between adjacent ribbons of the stack, and that the ribbon stack is not stranded:

$$R^2 - w^2/4 + \left(\sqrt{R^2 + 2wk} + t\right)^2 = 0, \text{ where}$$

$$k = -w/2 + \sqrt{R^2 - \left((n-1)t - \sqrt{R^2 - w^2/4}\right)^2}$$

$$k = -w/2 + \sqrt{R^2 - \left((n-1)y - \sqrt{R^2 - w^2/4}\right)^2}$$

In other embodiments, the free space may vary based on the number of fibers 116 in the ribbons 114 (and corresponding ribbon width), the number of ribbons 114 in the cable 110 (and corresponding stack height), and properties of the jacket material, such as jacket roughness or smoothness, coefficient of friction between the ribbons and the jacket material, modulus or strength of the material, and other properties.

Referring again to FIG. 1, the ribbon stack 114 is encased in a thin membrane 126 that holds the ribbons together. In some such embodiments, the thin membrane 126 is plastic, such as polyvinyl chloride, polypropylene, polyethylene. According to an exemplary embodiment, the cable 110 is in part manufactured by extruding the thin membrane 126 around the stack 114 of ribbons 116. During the process, vacuuming the extrusion cone of the thin membrane 126 may draw down the thin membrane 126 about the ribbon stack 114, tightly contacting and constraining the stack. In other embodiments, no membrane is used and the ribbons 116 of the stack 114 are free to move relative to one another.

Figure 2:
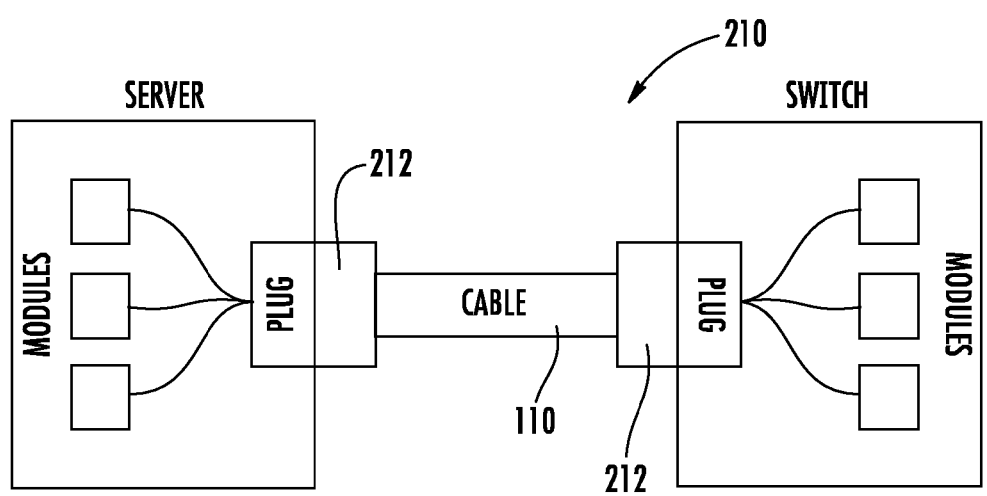
FIG. 2 is a schematic diagram of an assembly for high-speed data communication according to an exemplary embodiment.

Use of a particularly thin membrane 126, such as 1 mm or less in average thickness $T_m$ or even 0.5 mm or less, constrains the optical fibers 116 in the cable 110, but allows the stack 114 to move to low-stress positions as the cable 110 is handled. Another advantage of the thin membrane becomes apparent during connectorization with a twenty-four fiber MPO connector (e.g., connector 212 as shown in FIG. 2). The thin membrane 126 helps to control the relative movement between the ribbons 116, which makes aligning the ribbons 116 easier and facilitates feeding all three ribbons simultaneously into the associated connector(s).

According to an exemplary embodiment, the average thickness $T_m$ of the thin membrane 126 is less than that $T_j$ of the jacket 112, such as less than half, less than a quarter, or, in some embodiments, less than a tenth that of the jacket $T_j$. Accordingly, the membrane 126 constrains and binds the ribbon stack 114 while the jacket 112 shields the stack 114 from the environment.

According to an exemplary embodiment, the thin membrane 126 allows for easy removal of the membrane 126 from the ribbons 116. In some contemplated embodiments, the overall range for the peak strip force using a SOFT-STRIP® tool (available from Micro Electronics, Inc.) at a rate of 200 cm/min for a strip length of 50 mm is between 8 N (newtons) to 20 N, preferably less than 15 N and/or greater than 12 N. In other embodiments, the membrane may have a lesser strip force, such as less than 10 N, where the membrane is configured to be torn with one's bare fingers.

In contemplated embodiments, with high-performance bend-insensitive optical fibers 118 (e.g., some ClearCurve® fibers manufactured by Corning Incorporated), the amount of free space within the ribbon cable 110 may be reduced while keeping attenuation due to cable bending within acceptable levels. For example, some such cables 110 may have an outer diameter $D_o$ of 3.0 mm or less with a wall thickness $T_j$ of 0.45 mm or less, and/or an inner diameter $D_i$ of about 2.5 mm or less. Some such cables, may have about 0.1 mm of free space, but may still have relatively low attenuation because of the unique properties of the high-performance bend-insensitive optical fibers 118.

In some embodiments, the fibers 118 are "bend-insensitive" in that one-wrap of the fiber 118 around a 10 mm diameter mandrel results in an optical attenuation increase of less than 0.5 dB, less than 0.3 dB, less than 0.2 dB, or even less than 0.15 dB at an 850 nm wavelength, one-wrap of the fiber 118 around a 20 mm diameter mandrel results in an optical attenuation increase of less than 0.2 dB, less than 0.1 dB, or even less than 0.05 dB at an 850 nm wavelength, and/or one-wrap of the fiber 118 around a 15 mm diameter mandrel results in an optical attenuation increase of less than 0.2 dB, less than 0.1 dB, or even less than 0.05 dB at an 850 nm wavelength.

According to an exemplary embodiment, the ribbon stack extends through the cable in a generally straight manner, without being stranded (e.g., helically wound). Aided by the relatively large amount of free space in the cable, the ribbon stack maintains low attenuation in the optical fibers throughout bends in the cable by translating and/or rotating to a low-stress position within the cavity of the jacket. In other contemplated embodiments, the cable is stranded and has a particularly short lay length (i.e. the lengthwise distance along the cable for one complete turn of the twisted stack), such as between 50-250 mm, more preferably in the range of 60 mm to 120 mm, which allows the cable to bend easily and facilitates use of a ribbon cable in the crowded and low-space environment of a typical data center. However, providing a short lay length may reduce the manufacturing line speed relative to unstranded ribbon stacks.

Referring now to FIG. 2, the fiber optic ribbon cable 110 may be terminated with multi-fiber connectors 212 on each end, such as when used for parallel-optic transmission. The number of fibers 118 in the ribbons 116 and the number of ribbons 116 in the cable 110 may be determined by the specific application. For example, of two current configurations for parallel optics in the standards, one method uses four fibers 118 for transmitting and another four for receiving the signal. Such a system may achieve 40 Gbps with 10 Gbps transmitters or 100 Gbps with 25 Gbps transmitters. The second configuration uses ten fibers 118 for transmitting and ten for receiving, which is generally achieved with two 12-fiber ribbons.

According to an exemplary embodiment, the cable contains optical fiber ribbons 116 in which only one 128 of the fibers 118 is colored and the rest are not colored. FIG. 1 shows a cable 110 with three 8-fiber ribbons 116. Each ribbon 116, as well as its polarity, can be identified by the single colored fiber 128. Use of uncolored fibers has the advantages of reducing the labor involved in making the ribbon by removing the coloring step for many of the fibers 118 and making the ribbon smaller. For example, use of seven uncolored fibers may decrease the width of an eight-fiber ribbon by about 70 µm. For parallel optics configurations and other such contemplated applications, Applicants have found that the individual fibers 118 may not need to be separated from the ribbon 116 during connectorization. Rather, the complete ribbon may go into a single connector 212 designed for multiple fibers and identification of all individual fibers of ribbon may be unnecessary.

To recognize how to align the ribbon, Applicants have found that it is sufficient to have one colored fiber in the ribbon. Alignment of the other fibers of the ribbon is correspondingly achieved because the fibers are all held together in the ribbon. For cables with more than one ribbon, different colors may be used with the colored optical fibers to distinguish the individual ribbons. This process may eliminate a need to print on the ribbons, which is traditionally done to identify the individual ribbons.

Some cables disclosed herein have the advantage over traditional ribbon cables of being smaller, lighter in weight, and/or more flexible. The smaller size reduces the amount of materials in the cable and reduces materials cost. The cable has an advantage over traditional ribbon interconnect cables of eliminating preferential bending and enabling interconnect cables with more than two ribbons. Use of only one colored fiber in the ribbon reduces labor in making the ribbon while maintaining identification of the sequence of the fibers. Another advantage is that the ribbons can be more robust than traditional ribbons because there is no requirement to access each fiber individually. This can be achieved by selecting matrix materials with stronger bonding to the fibers.

Yet another advantage of ribbon cables, disclosed herein, is the ability to directly connectorized the ribbons (i.e. attach and integrate with a connector), without a need to "ribbonize" loose optical fibers (i.e. align the fibers side-by-side) or re-sequence loose optical fibers. Optical fiber order and relative positioning within each fiber optic ribbon has been maintained by the ribbon matrix. Accordingly, use of the ribbon cables may facilitate or enable automation or higher speeds/efficiency of "jumper," "pigtail," or "harness" cable assembly manufacturing, enhancing productivity and reducing manufacturing costs.

In some embodiments, a cable, with features similar to those of cable 110 or other cables disclosed herein, includes a stack of ribbons having from one to twelve ribbons, with each ribbon containing from eight to twelve optical fibers. In other embodiments, the stack 114 includes more ribbons 116 and/or some or all of the ribbons 116 contain more or fewer optical fibers 118, the ribbons of the stack may have differing numbers of optical fibers 118, such as a "pyramid" stack having wider ribbons toward the base of the pyramid. In contemplated embodiments, the cable includes more than one stack of fiber optic ribbons. In some embodiments, only one ribbon is used, instead of a stack.

The optical fibers of the fiber optic ribbons may be single-mode fibers, multi-mode fibers, multi-core fibers, bend-insensitive fibers, plastic optical fibers, or other types of optical fibers. The fiber optic ribbons may be fully encased in matrix resin, or only partially surrounded by resin or another bonding agent. The cable may be made with one or more electrical conductors, such as for powering an electronic device at one end of the cable. In contemplated embodiments, the stack may be further surrounded by a buffer tube between the strength members and the jacket or between the stack and the strength members. The cable may include additional features not shown in the Figures, such as one or more layers of armor, water-blocking tape, jacket access features, such as rip cords or co-extruded tear features, and/or other features.

The construction and arrangements of the fiber optic ribbon cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic ribbon cable, comprising:
  a stack of fiber optic ribbons comprising at least three fiber optic ribbons, wherein each fiber optic ribbon comprises at least eight optical fibers arranged side-by-side and coupled to one another in a common matrix; wherein each of the fiber optic ribbons of the stack comprises uncolored optical fibers, and wherein at least one of the optical fibers of the fiber optic ribbons of the stack is colored whereby orientation and polarity of one or more of the fiber optic ribbons of the stack is identifiable by the arrangement of the colored optical fiber with respect to the uncolored optical fibers;
  strength members surrounding the stack of fiber optic ribbons, wherein the strength members are at least one of positioned around the stack of ribbons and not rigid in bending such that the strength members do not have a bend preference; and
  a jacket defining an exterior of the fiber optic ribbon cable, wherein the jacket is structured such that the jacket does not have a bend preference, wherein the jacket has a thickness of at least 0.45 mm, and wherein the thickness of the jacket is 1.2 mm or less, wherein the jacket forms a cavity through which extends the stack of fiber optic ribbons and the strength members, wherein the strength members adjoin both the stack of fiber optic ribbons and the jacket; and
  wherein the stack of fiber optic ribbons has a bend preference, and wherein the cavity of the jacket is sized relative to the stack of fiber optic ribbons in order to allow the stack to bend and twist within the cavity with respect to the jacket as the cable bends, facilitating movement of the optical fibers of the fiber optic ribbons to low-stress positions within the cavity and decoupling the bend preference of the stack from transfer to the jacket.

2. The cable of claim 1, wherein each of the fiber optic ribbons of the stack has a colored optical fiber that is different from a correspondingly-positioned colored optical fiber of every other fiber optic ribbon of the stack.

3. The cable of claim 2, wherein each of the fiber optic ribbons includes edge fibers on ends of the ribbons, and wherein the colored optical fiber of each of the fiber optic ribbons is an edge fiber.

4. The cable of claim 3, wherein all optical fibers of each ribbon that are not edge fibers are uncolored.

5. The cable of claim 4, wherein one of the edge fibers of each of the fiber optic ribbons is uncolored.

6. The cable of claim 1, wherein the fiber optic ribbons of the stack are bound to one another and constrained within a thin membrane of polymeric material enclosing the stack of fiber optic ribbons around the exterior thereof, whereby the thin membrane of polymeric material limits movement of the fiber optic ribbons of the stack relative to one another, wherein the stack of fiber optic ribbons comprises at least three fiber optic ribbons, wherein each fiber optic ribbon comprises at least eight optical fibers arranged side-by-side and coupled to one another in a common matrix, and wherein the membrane is, on average, 1 mm or less thick and is tightly bound to the exterior of the stack of fiber optic ribbons such that the thin membrane overlays the top- and bottom-most ribbons of the stack of fiber optic ribbons and adjoins lateral edges of one or more fiber optic ribbons interior to the top- and bottom-most ribbons of the stack.

* * * * *